United States Patent
Lam et al.

(10) Patent No.: US 6,424,505 B1
(45) Date of Patent: Jul. 23, 2002

(54) METHOD AND SYSTEM FOR PROVIDING ELECTROSTATIC DISCHARGE PROTECTION FOR FLEX-ON SUSPENSION, TRACE-SUSPENSION ASSEMBLY, OR CABLE-ON SUSPENSION

(75) Inventors: Chung F. Lam, San Jose; Caleb Kai-lo Chang, Sunnyvale; Dino Tommy Anthony Martinez, San Jose, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/306,375

(22) Filed: May 6, 1999

(51) Int. Cl.⁷ .............................. G11B 5/40; G11B 5/39
(52) U.S. Cl. ....................................................... 360/323
(58) Field of Search .............................. 360/323, 264.2, 360/266.3, 244.1, 245.2, 245.8, 245.9, 246, 319, 322; 361/212, 220

(56) References Cited

U.S. PATENT DOCUMENTS

| | | |
|---|---|---|
| 3,917,978 A | 11/1975 | Menzel et al. |
| 4,317,149 A | 2/1982 | Elser et al. |
| 4,580,188 A | 4/1986 | Brown et al. |
| 4,586,106 A | 4/1986 | Frazier |
| 4,605,984 A | 8/1986 | Fiedler |
| 4,654,746 A | 3/1987 | Lewis, Jr. et al. |
| 4,800,454 A | 1/1989 | Schwarz et al. |
| 4,841,395 A | 6/1989 | Craft |
| 4,987,514 A | 1/1991 | Gailbreath et al. |
| 5,067,046 A | 11/1991 | Elton et al. |
| 5,163,850 A | 11/1992 | Cronin |
| 5,204,789 A * | 4/1993 | Jove et al. .................... 360/323 |
| 5,331,502 A | 7/1994 | Bakhoum |
| 5,465,186 A | 11/1995 | Bajorek et al. |
| 5,491,605 A | 2/1996 | Hughbanks et al. |
| 5,539,598 A * | 7/1996 | Denison et al. .............. 360/323 |
| 5,566,038 A | 10/1996 | Keel et al. |
| 5,638,237 A * | 6/1997 | Phipps et al. ................ 360/323 |
| 5,644,454 A | 7/1997 | Arya et al. |
| 5,654,850 A | 8/1997 | Ganapathi et al. |
| 5,699,212 A | 12/1997 | Erpelding et al. |
| 5,734,523 A | 3/1998 | Scheidecker et al. |
| 5,757,591 A | 5/1998 | Carr et al. |
| 5,761,009 A * | 6/1998 | Hughbanks et al. ......... 360/323 |
| 5,771,571 A | 6/1998 | Voldman et al. |
| 5,805,390 A * | 9/1998 | Takeura ........................ 360/323 |
| 5,812,349 A * | 9/1998 | Shouji et al. ................. 360/110 |
| 5,812,357 A | 9/1998 | Johansen et al. |
| 5,978,181 A * | 11/1999 | Niijima et al. .............. 360/323 |
| 6,146,813 A * | 11/2000 | Girard et al. ................ 430/319 |
| 6,163,443 A * | 12/2000 | Hatagami et al. ........... 360/323 |
| 6,212,046 B1 * | 4/2001 | Albrecht et al. .......... 360/264.2 |
| 6,233,127 B1 * | 5/2001 | Shimazawa .................. 360/323 |
| 6,246,553 B1 * | 6/2001 | Biskeborn .................... 360/323 |

FOREIGN PATENT DOCUMENTS

EP 651375 * 5/1995

OTHER PUBLICATIONS

IBM Technical Disclosure Bulletin, vol. 38, No. 01, Jan. 1995: "Manufacturable Magnetoresistive Slider Electrical Overstress Protector," pp. 401–404.

* cited by examiner

Primary Examiner—David L. Ometz
(74) Attorney, Agent, or Firm—Sawyer Law Group LLP (57) ABSTRACT

A method and system for protecting a suspension assembly, such as a flex-on-suspension or trace suspension assembly, is disclosed. The suspension assembly is for use with a magnetoresistive (MR) head including an MR sensor. The MR sensor has a first end and a second end. The method and system include providing a first lead coupled with the first end of the MR sensor and providing a second lead coupled with the second end of the MR sensor. The method and system further include providing an insulating film supporting a first portion of the first lead and a second portion of the second lead. The method and system also include providing a resistor coupled with the first lead, the resistor being sufficiently large to damp a transient current in the MR sensor.

16 Claims, 6 Drawing Sheets

Figure 1

Prior Art

Figure 2A

Prior Art

METHOD AND SYSTEM FOR PROVIDING ELECTROSTATIC DISCHARGE PROTECTION FOR FLEX-ON SUSPENSION, TRACE-SUSPENSION ASSEMBLY, OR CABLE-ON SUSPENSION

FIELD OF THE INVENTION

The present invention relates to magnetoresistive heads and more particularly to a method and system for providing electrostatic discharge protection for devices using a flex-on suspension, trace-suspension assembly, or a cable-on suspension.

BACKGROUND OF THE INVENTION

Magnetoresistive (MR) heads are increasingly popular for use in reading data from magnetic recording media. MR heads utilize an MR sensor in order to read data from the magnetic recording media. The MR sensor is typically either an anisotropic magnetoresistive (AMR) sensor or a giant magnetoresistive (GMR) sensor. In order to read data using the MR head, current is driven through the MR sensor. The change in resistance of the sensor due to the magnetic field of each bit stored in the recording media is translated into a signal. Thus, the stored data is read.

In order to use the MR head in a disk drive, the head is attached to a metal arm, or suspension, that can be used to suspend the head above the recording media. In order to function, electrical connection must be made to the MR sensor in the MR head. A conventional suspension assembly, therefore, includes a twisted pair of wires mechanically connected to the metal arm. Each wire in the twisted pair is connected to the MR sensor. Thus, electrical connection is made to the MR sensor, allowing current to be driven through the MR sensor. The combination of the head and suspension is known as a head-gimbal assembly. Sets of head-gimbal assemblies are stacked together to form a head-stack assembly. The head-gimbal assembly or head-stack assembly can be installed in a disk drive for use in reading recording media.

As the areal density of the bits stored in the recording media increases, the sizes of the MR sensor and MR head decrease. Thus, coupling the wires to the MR head while maintaining quality, performance, and manufacturability becomes increasingly difficult. As a result, other conventional suspension assemblies which do not use wires have been developed. Such conventional wireless suspension assemblies use other materials, such as polyimide materials (e.g. kapton), in a flat thin architecture. For example, Read-Rite Corp. of Milpitas, Calif. has developed flex-on-suspension (FOS) technology. Similarly, trace suspension assembly (TSA) and cable on suspension (COS) technology have been developed. Conventional wireless suspension assemblies using conventional FOS, conventional TSA, and conventional COS do not use a twisted pair of wires to provide electrical connection to the head. Instead, the conventional wireless suspension assemblies use leads supported by an insulating film. Typically, the insulating film is made from a polyimide material, such as kapton. Two leads are typically sandwiched between two layers of kapton. Both conventional FOS and conventional TSA utilize such a suspension assembly. However, the shape of the kapton-lead sandwich of the conventional FOS differs from the shape of the kapton-lead sandwich in the conventional TSA.

Although the conventional FOS, conventional TSA, and conventional COS suspension assemblies aid in manufacturing high areal density head-gimbal assemblies, conventional suspension assemblies such as conventional FOS and TSA suffer from failures. It has been determined that these failures are due to tribocharging of the kapton, which causes electrostatic discharge (ESD) damage. During fabrication, the kapton is subject to tribocharging. The tribocharge in the kapton traps an opposite charge in the leads near the location of the tribocharge. Thus, an excess charge that is free to move remains in the leads. If the leads are contacted, which typically happens during fabrication, the excess charge can flow through the leads and, therefore, the MR sensor. This flow of charge can destroy the MR sensor. In the alternative, the excess charge may reside on the MR sensor. In such a case, the charge at the MR sensor may jump to another portion of the MR head, such as the shield or substrate. This spark may also destroy the MR sensor. Thus, in head-gimbal assemblies using FOS or TSA, the MR sensor is relatively likely to be destroyed during fabrication.

Accordingly, what is needed is a system and method for providing a head-gimbal assembly using technology such as FOS, TSA, and COS and which is less subject to failure. The present invention addresses such a need.

SUMMARY OF THE INVENTION

The present invention provides a method and system for protecting a suspension assembly, for example for a flex-on-suspension or trace suspension assembly. The suspension assembly is for use with a magnetoresistive (MR) head including an MR sensor. The MR sensor has a first end and a second end. The method and system comprise providing a first lead coupled with the first end of the MR sensor and providing a second lead coupled with the second end of the MR sensor. The method and system further comprise providing an insulating film supporting a first portion of the first lead and a second portion of the second lead. In one aspect, the method and system also comprise providing a resistor coupled with the first lead, the resistor being sufficiently large to damp a transient current in the MR sensor. In another aspect, the method and system comprise providing a pair of resistors. Each resistor is coupled to one of the leads. The resistors are also coupled in parallel. Each resistor is large enough to damp the transient current in the MR sensor.

According to the system and method disclosed herein, the present invention can damp transient currents due to tribocharging. When the resistor or pair of resistors is coupled to ground, the system and method can also provide a path for charge due to tribocharging to be dissipated, thereby reducing or eliminating excess charge on the MR sensor. Consequently, the possibility of the damage or destruction of the MR sensor is reduced or eliminated.

DETAILED DESCRIPTION OF THE INVENTION

The present invention relates to an improvement in magnetoresistive technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
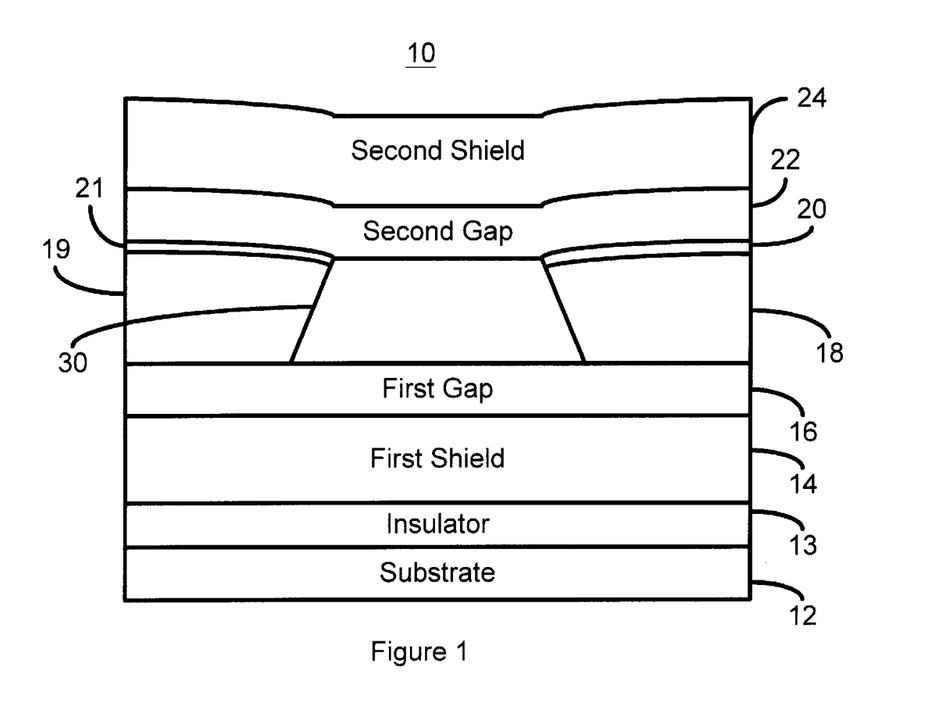
FIG. 1 is a block diagram of a magnetoresistive head.

FIG. 1 is a block diagram of a portion of a magnetoresistive (MR) head 10 used in reading magnetic recording media. The MR head 10 includes a substrate 12, which is a large portion of the slider. The MR head 10 includes an insulator 13, a first shield 14, a first gap 16, and magnetic bias 14 and 18. The MR head 10 includes an MR sensor 30. Typically, the MR sensor 10 is an anisotropic magnetoresistive (AMR) sensor or a giant magnetoresistive (GMR) sensor. The MR head 10 also includes two leads 20 and 21 for making electrical contact to the MR sensor 30. The MR head 10 also includes a second gap 22 and a second shield 24. The first gap 16 and the second gap 22 insulate the MR sensor 30 from the first shield 14 and the second shield 24, respectively. The first shield 14 and the second shield 24 magnetically isolate the MR sensor 30 from bits in the recording media (not shown) other than the bit currently being read.

In order to use the MR head 10 in a disk drive, electrical connection is made to the MR sensor 30 via the leads 20 and 21. In some conventional systems, a twisted pair of wires is used to connect to the leads 20 and 21. However, a twisted pair of wires may be difficult to handle during manufacturing and relatively expensive. Consequently, a conventional suspension assembly is provided.

Figure 2A:
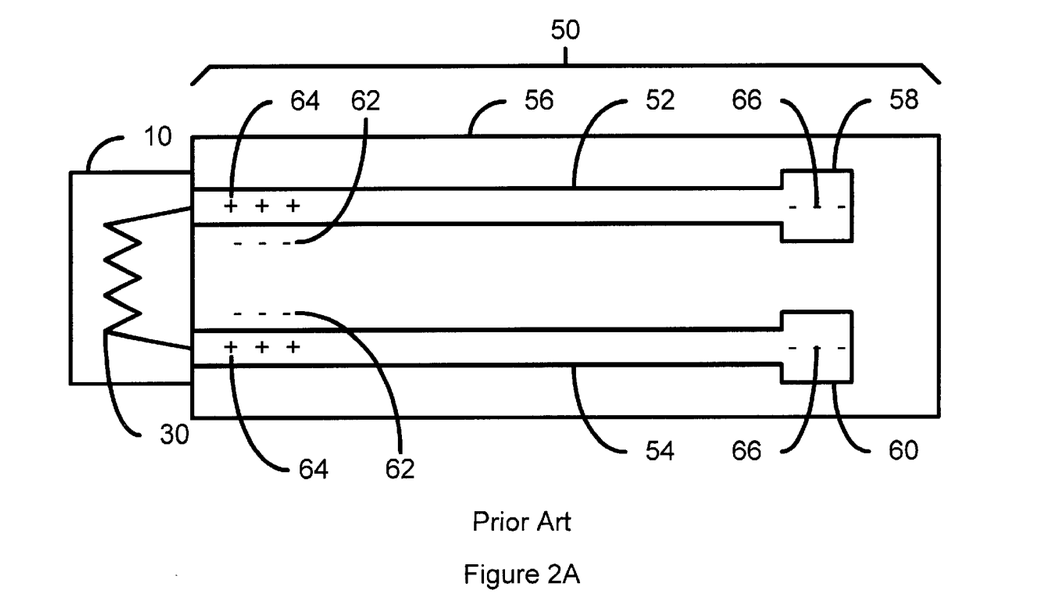
FIG. 2A is a block diagram of a conventional flexible assembly after tribocharging near the MR head.
Figure 2B:
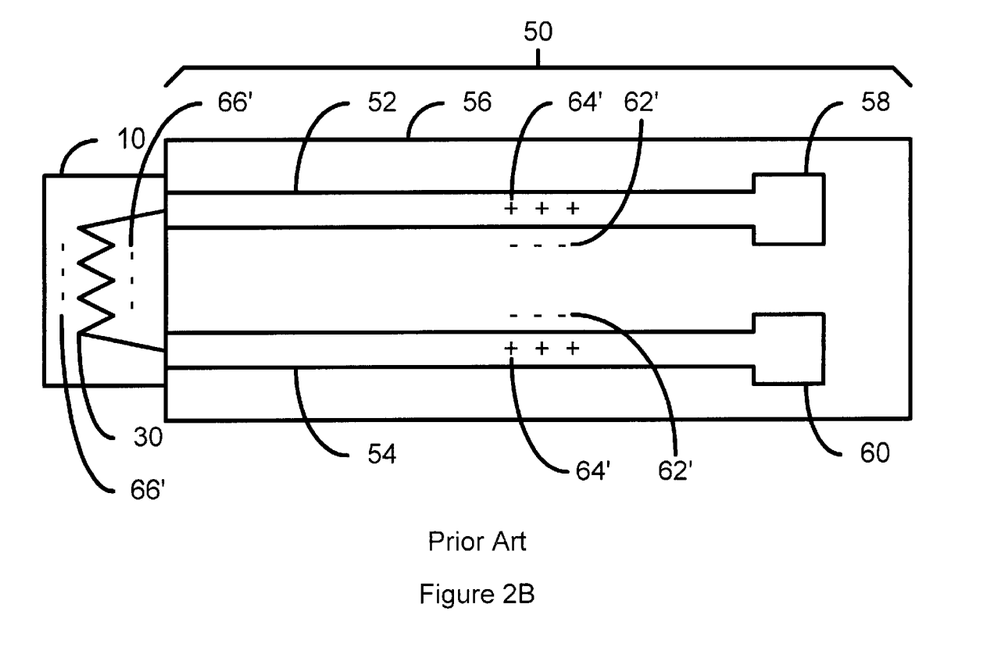
FIG. 2B is a block diagram of a conventional flexible assembly after tribocharging far from the MR head.

FIGS. 2A and 2B depict a conventional suspension assembly 50 coupled with the MR head 10. The conventional suspension assembly 50 is preferably used with a flex-on suspension (FOS) developed by Read-Rite Corporation of Milpitas, Calif., in a trace suspension assembly (TSA), or in a cable on suspension (COS). The conventional suspension assembly 50 has a wireless electrical connection with the MR head 10 that allows for a smaller form factor for the head and head-gimbal assembly.

Referring to FIG. 2A, the conventional suspension assembly 50 typically includes a metal arm (not shown) and typically is mechanically coupled with the MR head 10. For clarity, only the MR sensor 30 is separately depicted as a resistor in FIG. 2A. However, the MR head 10 may still include the same structures shown in FIG. 1. Referring back to FIG. 2A, the conventional suspension assembly 50 includes a first lead 52, a second lead 54, and an insulating film 56. The insulating film 56 is typically made of polyimide and includes two layers of kapton. The kapton 56 generally surrounds the leads 52 and 54. Thus, in the conventional suspension assembly 50 the leads 52 and 54 are typically sandwiched between two layers of kapton 56. However, in other embodiments, the leads 52 and 54 are provided on a single layer of kapton 56. The conventional suspension assembly 50 also includes two pads 58 and 60 coupled with the leads 52 and 54, respectively. The leads 52 and 54 are also electrically coupled with the MR sensor 30, preferably through leads 20 and 21 (not depicted in FIG. 2A). Thus, electrical connection can be made to the MR sensor 30 even when the MR head 10 is sufficiently small for use with current high-density recording media.

Although the conventional suspension assembly 50 functions in FOS and TSA, one of ordinary skill in the art will readily realize that the conventional suspension assembly 50 and head 10 are subject to failure. During fabrication, the MR sensor 30 is often rendered inoperative. In some cases, losses may be as high as ten to twenty percent. It has been determined that these losses are due to tribocharging of the suspension assembly 50. As higher density recording media is used, the MR head 10 is built smaller to be capable of reading high-density recording media. As the MR head 10 is reduced in size, more damage to the MR sensor 30 can be caused by smaller transient currents due to electrostatic discharge.

For example, FIG. 2A depicts the conventional suspension assembly 50 and MR head 10 when a charge has been added to the kapton 56 due to tribocharging during fabrication. Typically, the tribocharge is negative and can result in a voltage of up to approximately three thousand volts. The tribocharge 62 in FIG. 2A is depicted by negative signs on the kapton 56.

The tribocharge 62, which is on the kapton 56, induces a trapped charge 64 in the conductive leads 52 and 54. The trapped charge 64 is opposite to the tribocharge 62. Thus, the trapped charge 64 neutralizes the kapton 56 in the region of the tribocharge 62. Because the tribocharge 62 is negative in FIG. 2A, the trapped charge 64 is positive. However, if the tribocharge 62 is positive, then the trapped charge 64 would be negative.

Because the trapped charge 64 must stay in the region of the tribocharge 62, there is an excess charge 66 that is free to move through the leads 52 and 54. The excess charge 66 is opposite to the trapped charge 64 and would neutralize the trapped charge 64 in the absence of the tribocharge 62. The excess charge 66 may accumulate in the leads 52 and 54 and generally accumulates away from the trapped charge 64. In FIG. 2A, the tribocharge 62 and trapped charge 64 are depicted near the MR head 10, while the excess charge is shown as accumulating in the pads 58 and 60.

During fabrication, electrical contact may be made a portion of the head 10 or a portion of the conventional suspension assembly 50 electrically connected with the leads 52 and 54. For example, electrical connection may be made by touching a conductor (not shown) to the pad 60. When connection is made to the pad 60, a transient current will flow, eliminating the excess charge 66. This transient current may be extremely large and does die out. Typically, the transient current flows in two directions, both to and from the MR sensor 30. However, the net direction of current flow is in a single direction. The transient current flowing through the MR sensor 30 may destroy the MR sensor 30. The head 10 and conventional suspension assembly 50 are, therefore, rendered unusable.

FIG. 2B depicts the head 10 and conventional suspension assembly 50 and MR head 10 when a tribocharge 62' is generated in a portion of the kapton 56 that is relatively far from the MR head 10. The trapped charge 64' induced in the leads 52 and 54 is located in proximity to the tribocharge 62' and relatively far from the MR head 10. The excess charge 66' may thus accumulate in the MR sensor 30, but is free to move. Although depicted as surrounding the MR sensor 30, the excess charge 66' actually accumulate s on the MR sensor 30. Even if electrical contact is not made to the pad 58 or 60, the excess charge 66' may jump from the MR sensor 30 to one of the shields 14 or 24 depicted in FIG. 1. Thus, electrical breakdown between the MR sensor 30 and one of the shields 14 or 24 may occur. Referring back to FIG. 2B, if the excess charge 66' jumps from the MR sensor 30, the MR sensor 30 may still be damaged or destroyed. Consequently, the MR sensor 30 may still be destroyed.

The present invention provides a method and system for providing a suspension assembly, such as a flex-on-suspension or trace suspension assembly. The suspension assembly is for use with a magnetoresistive (MR) head including an MR sensor. The MR sensor has a first end and a second end. The method and system comprise providing a first lead coupled with the first end of the MR sensor and providing a second lead coupled with the second end of the MR sensor. The method and system further comprise providing an insulating film supporting a first portion of the first lead and a second portion of the second lead. The method and system also comprise providing a resistor coupled with the first lead, the resistor being sufficiently large to damp a transient current in the MR sensor.

The present invention will be described in terms of FOS, TSA, and COS suspension technologies. However, one of ordinary skill in the art will readily recognize that this method and system will operate effectively for other suspension technologies having similar components. Furthermore, the present invention will be described in terms of specific materials, such as kapton, and a particular MR head 10. However, one of ordinary skill in the art will readily realize that the present invention is consistent with other materials and other MR heads.

Figure 3:
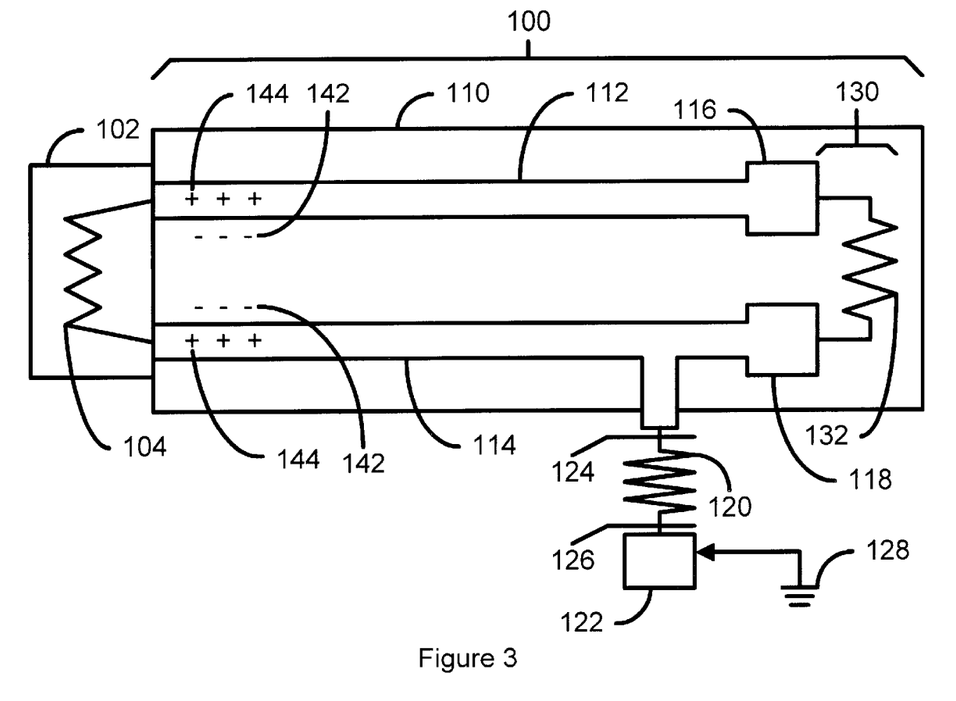
FIG. 3 is a block diagram of one embodiment of suspension assembly in accordance with the present invention.

To more particularly illustrate the method and system in accordance with the present invention, refer now to FIG. 3, depicting one embodiment of a suspension assembly 100 in accordance with the present invention that is coupled with an MR head 102. For clarity, only the MR sensor 104 of the MR head 102 is depicted. However, the MR head 102 is analogous to the MR head 10. Consequently, the MR head 102 has other components, such as leads, shields, and gaps, which are not explicitly depicted.

The suspension assembly 100 includes an insulating film 110 supporting a first lead 112 and a second lead 114. Also in a preferred embodiment, the suspension assembly 100 includes a metal support structure (not shown) attached to the insulating film 110. The insulating film 110 is preferably made of polyimide. In a preferred embodiment, the insulating film 110 includes two layers of kapton 110 which sandwich the leads 112 and 114. Thus, in a preferred embodiment, the kapton 110 surrounds the leads 112 and 114. In an alternate embodiment, one layer of kapton 110 supports the leads 112 and 114, allowing the leads 112 and 114 to be exposed. The suspension assembly 100 also includes pads 116 and 118 for making electrical contact to the leads 112 and 114 and, therefore, the MR sensor 104. The suspension assembly 100 also includes a resistor 120 coupled to the second lead 114. However, the exact lead to which the resistor 120 is coupled is not important. The resistor 120 is sufficiently large to damp a transient current due to tribocharging of the kapton 110. For example, the kapton 110 may be tribocharged to a voltage of approximately three thousand volts. Thus, the resistor 120 is preferably on the order of one-tenth of a megaohm to one thousand megaohms ($10^5$–$10^9$ M$\Omega$). The resistor 120 is coupled to a ground pad 122, which may be electrically connected to ground 128.

FIG. 3 also depicts a tribocharge 142 that has been generated on the kapton 110, for example during manufacturing. The tribocharge 142 has induced a trapped charge 144 in the leads 112 and 114. The trapped charge 144 neutralizes the kapton 110 in the region of the tribocharge 142. An excess charge (not shown) that is free to move is also generated. Although the excess charge is generated because of the trapped charge, the excess charge may not damage the MR sensor 104. Instead, the resistor 120 and ground pad 122 provide a high resistance path to ground 128. In other words, a soft ground is provided through the resistor 120 and ground pad 122. As a result, the excess charge can leak away safely. Consequently, this excess charge is not shown. Because the resistor 120 has a sufficiently high value, the transient current generated as the excess charge leaks away is small. For example, in one embodiment, the maximum transient current is on the order of 3 mA for a tribocharge 142 having an associated voltage of three thousand volts. This current is sufficiently low that the MR sensor 104 is not destroyed. The MR sensor 104 is protected from damage due to transient currents. Therefore, the suspension assembly 100 and MR head 102 combination is less likely to fail.

The suspension assembly 100 also has optional cut-off lines 124 and 126, and optional shunt 130 which includes a resistor 132. The optional cut-off lines 124 and 126 and the optional shunt 130 are for temporarily cutting off the resistor 120 and the ground pad 122, and temporarily shunting the leads 112 and 114, respectively. Thus, the optional cut-off lines 124 and 126 and the optional shunt 130 would be used only temporarily.

The resistor 132 in the optional shunt 130 is sufficiently large to damp transient currents when the ground pad 122 or resistor is cut off using cut-off line 126 or 124, respectively. Thus, damage to the MR sensor 104 can be prevented. Furthermore, the resistor 132 is large enough that the magnetic test and the operation of the MR sensor 104 are not affected by the presence of the shunt 130.

The first optional cut-off line 126 allows the ground pad 122 to be cut off. Because the resistor 120 is relatively large and still coupled with the leads 112 and 114, any transient current due to an excess charge bleeding off of the leads 112 and 114, the pads 116 and 118, or the MR sensor 104 is still greatly reduced. Thus, the MR sensor 104 is still protected.

The second optional cut-off line 124 allows the resistor 120 to be cut off from the lead 114. However, the second optional cut-off line 124 should not be used without using optional shunt 130. If the resistor 120 is cut off, the shunt 130 may still provide some protection against large transient currents due to a tribocharge 142. Note that the optional shunt 130 could also be used permanently, to permanently reduce the risk of electrostatic discharge (ESD) damage to the MR sensor 104. The optional shunt 130 could be used in the absence of the optional cut-off lines 124 and 126, in the absence of the resistor 120, or in the absence of the ground pad 122. Thus, in one embodiment, the optional shunt 130 could provide the only ESD protection for the MR sensor 104. However, better protection is provided by the utilizing the resistor 120 coupled to the ground 128.

Figure 4A:
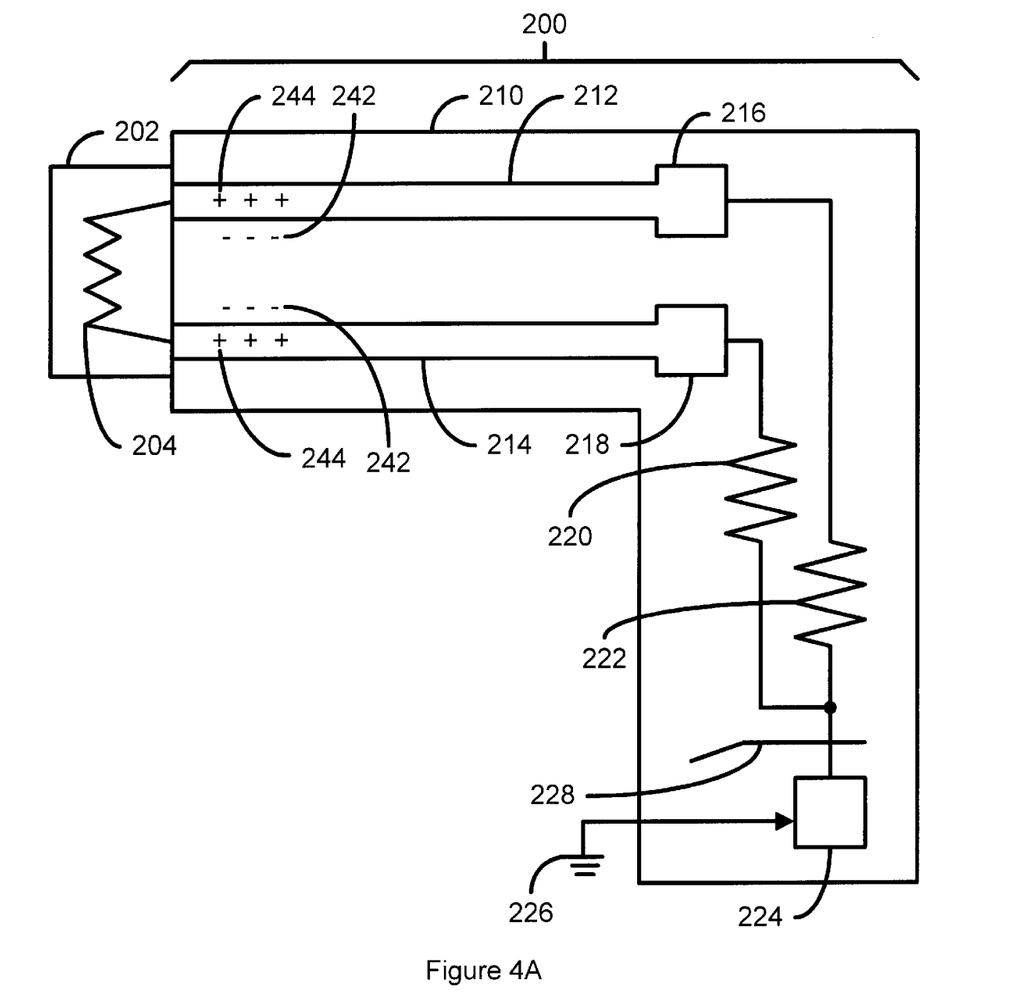
FIG. 4A is a block diagram of a preferred embodiment of suspension assembly in accordance with the present invention.

FIG. 4A depicts a preferred embodiment of a suspension assembly 200 in accordance with the present invention. The suspension assembly 200 is coupled to the MR head 202. The MR head 202 is depicted as including an MR sensor 204. However, the MR head 202 is analogous to the MR head 10. Thus, other components, such as shields, gaps, and leads, are present in the MR head 202. The suspension assembly 200 also preferably includes a metal support structure (not shown) to be attached to the kapton 210.

The suspension assembly 200 includes leads 212 and 214 supported by an insulating film 210. The insulating film 210 is preferably a polyimide. In a preferred embodiment, the insulating film 210 includes two layers of kapton 210 that sandwich the leads 212 and 214. Thus, in a preferred embodiment, the kapton 210 surrounds the leads 212 and 214. In an alternate embodiment, one layer of kapton 210 supports the leads 212 and 214, allowing the leads 212 and 214 to be exposed. The suspension assembly 200 also includes pads 216 and 218 for making electrical contact to the leads 212 and 214 and, therefore, the MR sensor 204. The suspension assembly 200 also includes resistors 220 and 222 coupled to the pads 216 and 218, respectively. The resistors 220 and 222 are each sufficiently large to damp a transient current due to tribocharging of the kapton 210. For example, the kapton 210 may be tribocharged to a voltage of approximately three thousand volts. Thus, the resistors 220 and 222 are each preferably on the order of one-tenth of a megaohm to one thousand megaohms ($10^5$–$10^9$ MΩ). The resistors 220 and 222 are also coupled in parallel to a ground pad 224. The ground pad 224 may be coupled to ground 226.

FIG. 4A also depicts a tribocharge 242 that has been generated on the kapton 210, for example during manufacturing. The tribocharge 242 has induced a trapped charge 244 in the leads 212 and 214. The trapped charge 244 neutralizes the suspension assembly 200 in the region of the tribocharge 242. Although an excess charge (not shown) is generated because of the trapped charge, the excess charge may not damage the MR sensor 204. Instead, the resistors 220 and 222, and ground pad 224 provide a high resistance path to ground 226. In other words, a soft ground is provided through the resistors 220 and 222 and ground pad 224. As a result, the excess charge slowly leaks away. Consequently, this excess charge is not shown. Because the resistors 220 and 222 have a sufficiently high value, the transient current generated as the excess charge leaks away is small. For example, in one embodiment, the transient current is on the order of 3 mA for a tribocharge 242 having an associated voltage of three thousand volts. This current is sufficiently low that the MR sensor 204 is not destroyed. Furthermore, the resistors 220 and 222 are coupled together. Thus, the resistors 220 and 222 also provide a shunt, which aids in protecting the MR sensor 204 from electrostatic discharge. Consequently, the MR sensor 204 is protected from damage due to transient currents. Thus, the suspension assembly 200 and MR head 202 combination are less likely to fail.

The suspension assembly 200 also has an optional cut-off line 228. The optional cut-off line 228 allows the ground pad 224 to be cut off. Because the resistors 220 and 222 are relatively large and still provide a shunt for the leads 212 and 214, any transient current due to an excess charge bleeding off of the leads 212 and 214, the pads 216 and 218, or the MR sensor 204 is still greatly reduced. Thus, the MR sensor 204 is still protected. Note that in an alternate embodiment, the resistors 220 and 222 may be cut off, for example once manufacturing of the suspension assembly 200 is complete.

Figure 4B:
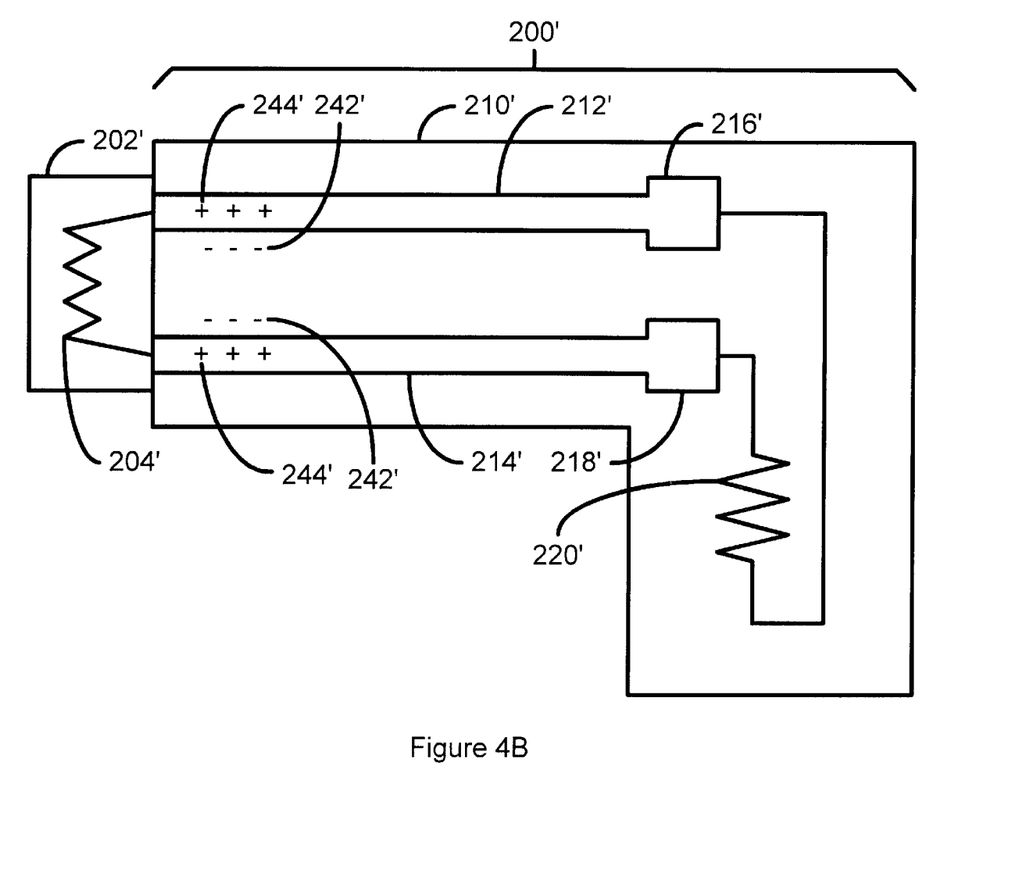
FIG. 4B is a block diagram of a fourth embodiment of suspension assembly in accordance with the present invention.

FIG. 4B depicts an alternate embodiment of a suspension assembly 200' and MR head 202'. The suspension assembly 200' and the MR head 202' correspond to the suspension assembly 200 and the MR head 202 depicted in FIG. 4A. Thus, the suspension assembly 200 also preferably includes a metal support structure (not shown) to be attached to the kapton 210. However, the suspension assembly 200' does not include the pad 224 or the cut-off line 228. Consequently, the resistor 220' acts as a shunt for the leads 212' and 214'. Furthermore, because the resistor 220' is relatively large, any transient current in the leads 212' and 214' will be significantly damped. Therefore, the MR sensor 204' may be protected from damage.

Figure 5:
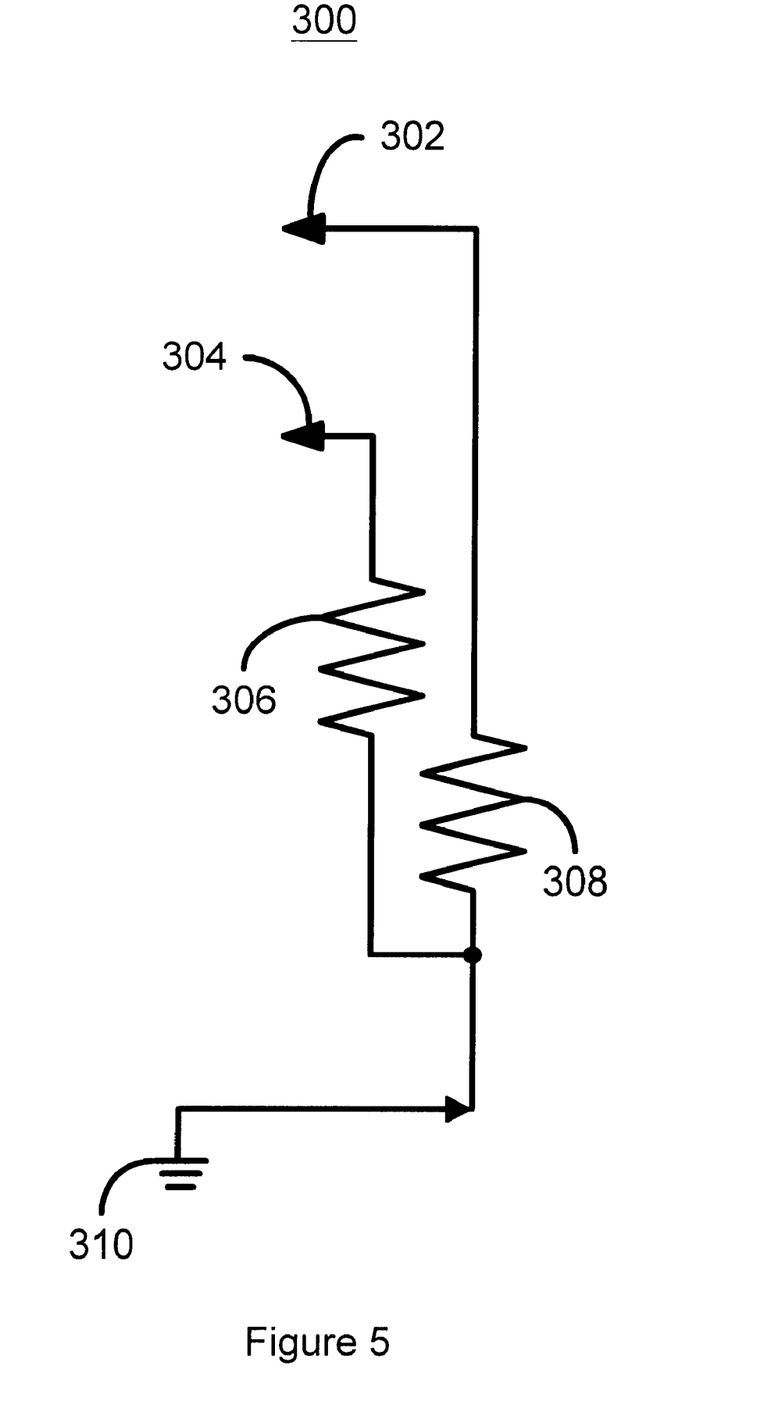
FIG. 5 is a block diagram of an embodiment of a tool in accordance with the present invention.

FIG. 5 depicts an embodiment of a tool 300 in accordance with the present invention for use with a conventional suspension assembly, such as the conventional suspension assembly 50. The tool 300 includes tips 302 and 304. The tips 302 and 304 are for making contact with pads 58 and 60 of the conventional suspension assembly 50. The tips are electrically coupled to resistors 306 and 308. The resistors 306 and 308 are each sufficiently large to damp a transient current due to tribocharging of the kapton 56. For example, the kapton 56 may be tribocharged to a voltage of approximately three thousand volts. Thus, the resistors 306 and 308 are each preferably on the order of one-tenth of a megaohm to one thousand megaohms ($10^5$–$10^9$ MΩ). The resistors 306 and 308 are also coupled in parallel to a ground 310. Thus, the resistors 306 and 308 provide a high resistance shunt to ground for the leads 52 and 54 of the conventional suspension assembly 50. The resistors 306 and 308 function similarly to the resistors 220 and 222 depicted in FIG. 4A. Referring back to FIG. 5, the tool 300 is thus a mirror image of a portion of the suspension assembly 200. The resistors 306 and 308 are preferably in close proximity to the tips 302 and 304 in order to reduce any capacitance due to the wiring between the tips 302 and 304 and the resistors 306 and 308.

The resistors 306 and 308 allow an excess charge (not shown) to slowly bleed off at a current safe for the MR sensor 30. Thus, the tool 300 helps to protect the MR sensor 30 from damage due to tribocharging of the kapton 56. The tool 300 is placed so that the tips 302 and 304 make electrical contact with the pads 58 and 60. Thus, the MR sensor 30 coupled to the leads 52 and 54 of the conventional suspension assembly 50 is protected from damage during assembly. The tool 300 may be removed from electrical contact with the conventional suspension assembly 50 when the manufacturing process is complete and the head 10 is to be installed in the disk drive (not shown).

Because the suspension assemblies 100, 200, and 200' and the tool 300 provide at least one dampening resistor and, in some cases, a shunt, the MR sensor 104, 104', 204, 204' and 30, respectively, is protected from damage. Thus, the yield for a process of forming such wireless suspension assemblies is improved. This may also reduce the cost of disk drives using the suspension assemblies 100, 200, and 200' or disk drives for which the tool 300 is used.

A method and system has been disclosed for providing a wireless suspension assembly which protects the MR sensor from damage due to electrostatic discharge. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A suspension assembly for use with a magnetoresistive (MR) head including an MR sensor, the MR sensor having a first end and a second end, the suspension assembly comprising:

a first lead coupled with the first end of the MR sensor;
    a second lead coupled with the second end of the MR sensor:
        an insulating film substantially supporting the first lead and the second lead; and a resistor coupled directly between the first lead and the second lead, the resistor being sufficiently large to damp a transient current in the MR sensor, the resistor coupling the first lead to ground;

wherein either the first lead or the second lead can carry current to the MR sensor.

2. The suspension assembly of claim 1 wherein the insulating film further includes:

a first polyimide layer substantially below the first lead and the second lead; and a second polyimide layer substantially above the first lead and the second lead.

3. The suspension assembly of claim 1 wherein the resistor is at least approximately one megaohm.

4. The suspension assembly of claim 1 further comprising:

a ground pad coupled to the resistor for coupling the resistor to ground.

5. The suspension assembly of claim 1 wherein the first lead carries current to the MR sensor.

6. A suspension assembly for use with a magnetoresistive (MR) head including an MR sensor, the MR sensor having a first end and a second end, the suspension assembly comprising:

a first lead coupled with the first end of the MR sensor, the first lead including a first end;

a second lead coupled with the second end of the MR sensor, the second lead including a first end;

an insulating film substantially supporting the first lead and the second lead;

a resistor coupled directly between the first lead and the second lead, the resistor being sufficiently large to damp a transient current in the MR sensor, the resistor being coupled with the first end of the first lead; and a second resistor coupled with the first end of the second lead, the resistor and the second resistor being coupled to ground, the second resistor being sufficiently large to damp the transient current in the MR sensor.

7. A suspension assembly for use with a magnetoresistive (MR) head including an MR sensor, the MR sensor having a first end and a second end, the suspension assembly comprising:

a first lead coupled with the first end of the MR sensor, the first lead including a first end;

a second lead coupled with the second end of the MR sensor, the second lead including a second end;

an insulating film substantially supporting the first lead and the second lead;

a resistor coupled directly between the first lead and the second lead, the resistor being sufficiently large to damp a transient current in the MR sensor, the resistor including a first end and a second end, the first end of the resistor being coupled with the first end of the first lead; and a second resistor including a first end and a second end, the first end of the second resistor being coupled with the first end of the second lead, the second end of the second resistor being coupled with the second end of the resistor, the second resistor being sufficiently large to damp the transient current in the MR sensor.

8. The suspension assembly of claim 7 further comprising:

a ground pad coupled with the second end of the resistor and the second end of the second resistor, the ground pad for coupling the first resistor and the second resistor with ground.

9. A method for providing a suspension assembly coupled with an MR head having an MR sensor, the MR sensor having a first end and a second end, the method comprising the steps of:

(a) providing a first lead coupled with the first end of the MR sensor;

(b) providing a second lead coupled with the second end of the MR sensor;

(c) providing an insulating film supporting the first lead and the second lead; and (d) providing a resistor coupled directly between the first lead and the second lead, the resistor being sufficiently, large to damp a transient current in the MR sensor, the resistor coupling the first lead to ground;

wherein either the first lead or the second lead can carry current to the MR sensor.

10. The method of claim 9 wherein the insulating film further includes a first polyimide layer substantially below the first lead and the second lead and a second polyimide layer substantially above the first lead and the second lead.

11. The method of claim 9 wherein the resistor is at least approximately one megaohm.

12. The method of claim 9 further comprising the step of:

(e) coupling the resistor to ground.

13. The method of claim 9 wherein the first lead carries current to the MR sensor.

14. A method for providing a suspension assembly coupled with an MR head having an MR sensor, the MR sensor having a first end and a second end, the method comprising the steps of:

(a) providing a first lead coupled with the first end of the MR sensor, the first lead including a first end;

(b) providing a second lead coupled with the second end of the MR sensor, the second lead including a first end;

(c) providing an insulating film supporting the first lead and the second lead;

(d) providing a resistor coupled directly between the first lead and the second lead, the resistor being sufficiently, large to damp a transient current in the MR sensor, the resistor being coupled with the first end of the first lead; and (e) providing a second resistor coupled with the first end of the second lead, the resistor and the second resistor being coupled to ground, the second resistor being sufficiently large to damp the transient current in the MR sensor.

15. A method for providing a suspension assembly coupled with an MR head having an MR sensor, the MR sensor having a first end and a second end, the method comprising the steps of:

(a) providing a first lead coupled with the first end of the MR sensor, the first lead including a first end;

(b) providing a second lead coupled with the second end of the MR sensor, the second lead including a first end;

(c) providing an insulating film supporting the first lead and the second lead; and (d) providing a resistor coupled directly between the first lead and the second lead, the resistor being sufficiently, large to damp a transient current in the MR sensor, the resistor including a first end and a second end, the first end of the resistor being coupled with the first end of the first lead;

(e) a second resistor including a first end and a second end, the first end of the second resistor being coupled with the first end of the second lead, the second end of the second resistor being coupled with the second end of the resistor, the second resistor being sufficiently large to damp the transient current in the MR sensor.

16. The method of claim 15 further comprising the steps of:

(e) coupling the first resistor and the second resistor with ground.

* * * * *